United States Patent [19]

Winkelmann et al.

[11] Patent Number: 5,063,904
[45] Date of Patent: Nov. 12, 1991

[54] MECHANICALLY DRIVEN SUPERCHARGER FOR AN INTERNAL COMBUSTION ENGINE

[75] Inventors: Siegfried Winkelmann, Tettnang; Karl Schlichtig, Friedrichshafen, both of Fed. Rep. of Germany; Harald Breisch, Kressbronn, Austria

[73] Assignee: Zahnradfabrik Friedrichshafen, AG, Friedrichshafen, Fed. Rep. of Germany

[21] Appl. No.: 460,910
[22] PCT Filed: Aug. 31, 1988
[86] PCT No.: PCT/EP88/00782
§ 371 Date: Feb. 20, 1990
§ 102(e) Date: Feb. 20, 1990
[87] PCT Pub. No.: WO89/02536
PCT Pub. Date: Mar. 23, 1989

[30] Foreign Application Priority Data

Sep. 5, 1987 [DE] Fed. Rep. of Germany ....... 3729888

[51] Int. Cl.$^5$ ............................................. F02B 33/00
[52] U.S. Cl. ................................. 123/559.1; 123/561
[58] Field of Search ............... 123/559.1, 561; 74/413, 74/421 R; 384/542, 585

[56] References Cited

FOREIGN PATENT DOCUMENTS 0158681 6/1984 European Pat. Off. .
2580723 4/1985 France .

Primary Examiner—Richard A. Bertsch
Assistant Examiner—Alfred Basichas
Attorney, Agent, or Firm—Albert M. Zalkind

[57] ABSTRACT

In a mechanically driven supercharger (1) whose rotor (6) is propelled by an internal combustion engine by way of a primary shaft (2), a planet gear (8) that is geared up and a rotor shaft (7), the working life of a support (11, 12) for the rotor shaft (7) is increased. For that purpose, the support floats with radial play (17) and axial play (19) in a fixed housing section (10) of the supercharger (1).

10 Claims, 1 Drawing Sheet

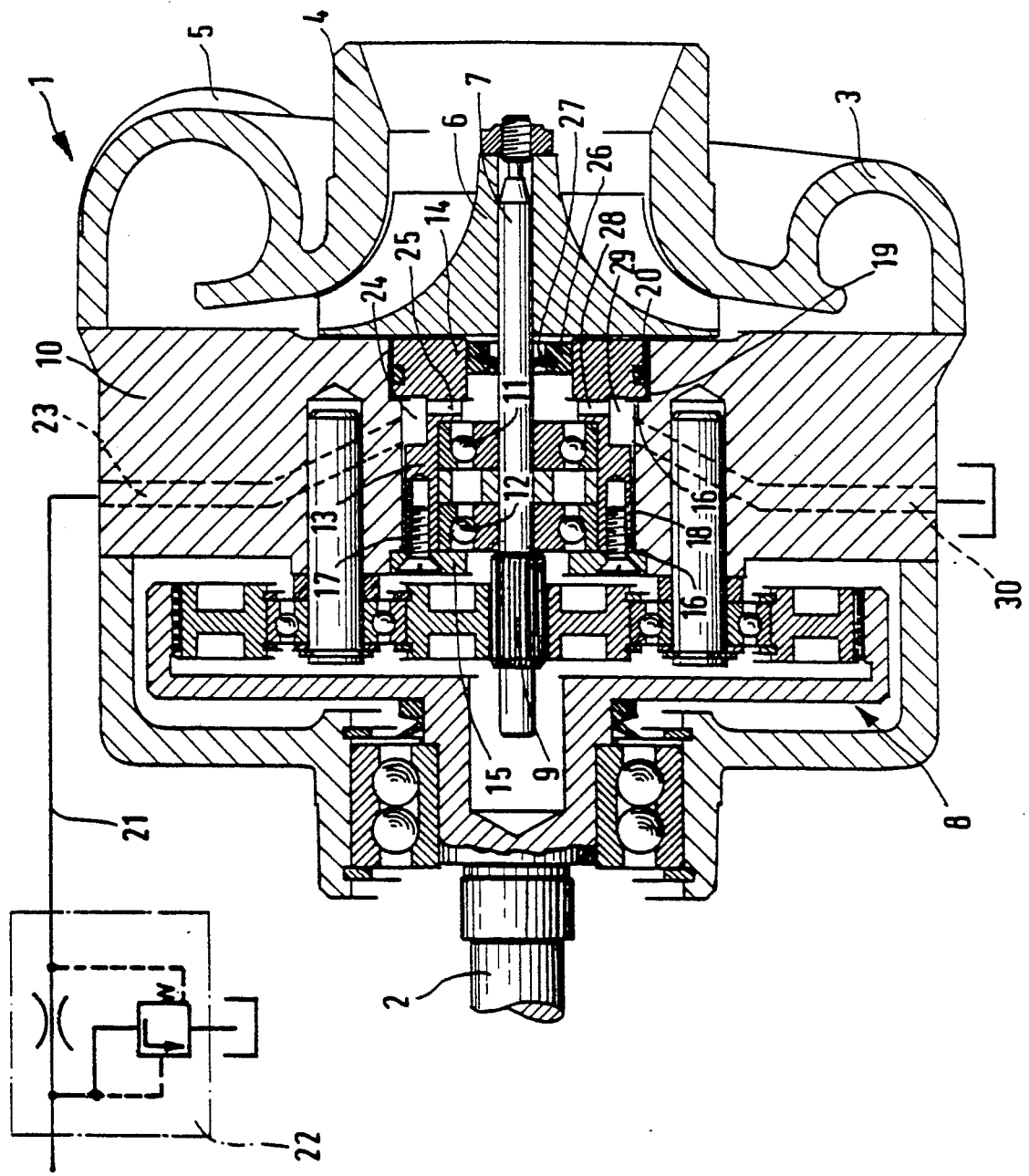

MECHANICALLY DRIVEN SUPERCHARGER FOR AN INTERNAL COMBUSTION ENGINE

BACKGROUND OF THE INVENTION

The invention relates to a mechanically driven supercharger for an internal combustion engine with a rotor shaft capable of being propelled by a primary shaft and a step-up gear that is a planet gear, with the rotor shaft running coaxially to the primary shaft and receiving a sun wheel of the planet gear.

BRIEF DESCRIPTION OF THE PRIOR ART

Driving a supercharger with a step-down gear of the above-mentioned type that is a planet gear is known from DE-PS 582 797. When the supercharging device is located at the front of the internal combustion engine, a shiftable friction clutch and the step-down gear are located in a first housing, while the rotor shaft that is propelled with high gearing leads to the rotor that is located in a separate housing. Structurally, the entire layout of the supercharger has large dimensions and is not suitable for use on an internal combustion engine being operated in a motor vehicle. Furthermore, the manner in which the rotor shaft driven with a very high number of revolutions is to be supported is not indicated in the prior art.

SUMMARY OF THE INVENTION

Therefore, the object of the present invention is to provide a compact mechanical driving mechanism of a supercharger whose support of the rotor shaft will achieve a long working life in spite of a high number of shaft revolutions.

That object is accomplished in accordance with the invention by letting the support of the rotor shaft have radial and axial play with respect to its location in a fixed housing section of the supercharger. The radial play of the support results in a pronounced reduction of the strain resulting from the residual imbalance of the rotor shaft and the sun wheel. Specifically, because of the radial play, the degree of freedom of the rotor shaft's support is increased in such a way that a rotation of the rotor shaft around its centroidal axis is made possible. The supporting forces come into being because the forces of gravity can be reduced considerably. The axial play makes free movement of the support within the radial play possible.

According to additional embodiments, the radial play should be up to 0.1 mm, and preferably 0.5 mm. A radial play of that order of magnitude makes the positioning of the rotation axis of the support on the centroidal axis of the rotor shaft possible. Furthermore, a damping device should be fitted in the annular gap created by the radial play, so that the support floats in the housing section. For an additional reduction of the strain, it is advantageous to support the rotor shaft between the rotor and the step-up gear. Locating the support between the rotor and the step-up gear results, on the one hand, in a very compact construction of the driving mechanism and prevents the rotor shaft from being vibrated by the primary shaft.

The support can have two sloping-shoulder bearings that are located in such a way that they enclose a large supporting space on the rotor shaft. The angular ball bearings are in position to absorb high radial and axial forces. These angular ball bearings can be located in a cylindrical guide bearing in another embodiment of the invention in which provision is made for the radial and axial play of the support between the outer jacket of the guide bearing and a location hole of the fixed housing section. Lubricating oil is delivered to the support or rings located in the annular gap which are suitable as damping means, with those rings simultaneously ensuring a secure passage of the lubricating oil to the support as sealing elements and sealing the planet gear off against the supercharger.

The guide bearing is axially fixed when the guide bearing is supported on one end with a radial collar at the fixed housing section, while a ring is fastened to it with screws or clamps on the other end. By that means, as is suggested in other embodiments of the invention, the entire unit consisting of the rotor, rotor shaft, angular ball bearings, guide bearing and sun wheel can also be preassembled and counterbalanced. Further disassembling of the preassembled unit before it is assembled in the supercharger, with the danger that fresh balancing errors could crop up, is eliminated. To increase the working life of the support, it is suggested, in addition, that the angular ball bearings be provided with closed cages carried on the edge—that is, the cages are carried on the inner and/or the outer ring of the angular ball bearing, as a result of which the concentric travel of the ball bearing is improved.

To improve the supply of the angular ball bearings with lubricating oil, two alternative possibilities are suggested. First, the support should be sealed off with a shaft gasket to the rotor during delivery of lubricating oil between the two angular ball bearings, so that the air compressed by the rotor cannot blow the lubricating oil out of the supports. Second, when the lubricating oil is being conveyed in the area between the rotor and the angular ball bearing adjacent to it, a shaft gasket can be provided between the rotor shaft and the guide bearing that, because of the conformation of its sealing lip, lets a certain manifold pressure flow reach the supply of lubricating oil, so that the lubricating oil is conveyed into the two angular ball bearings under induction pressure. When the internal combustion engine lacks induction pressure and suction operation, the sealing lip blocks off the area conveying lubricant against the rotor. Finally, the guide bearing can have recesses produced on a chordal curve at its circumference, each of which separately serves the purpose of delivering and carrying off the lubricating agent.

BRIEF DESCRIPTION OF THE DRAWING

For further explanation of the invention, reference is made to the drawing, in which an embodiment is represented in longitudinal section as an example.

DETAILED DESCRIPTION

In the drawing, a mechanically driven supercharger that serves the purpose of supercharging an internal combustion engine (not shown) is designated with 1, and it is capable of being propelled mechanically by means of a primary shaft 2. The supercharger 1 consists of the compressor housing 3 with an axial air suction connecting piece 4 and a manifold pressure connecting piece 5 running tangentially. Furthermore, a rotor 6 is located in the compressor housing 3 that is propelled at a high number of rotations by a rotor shaft 7. The driving of the rotor shaft 7 takes place from the primary shaft 2 by means of a planetary aggregate 8 on its sun wheel 9, which is fixed on the rotor shaft 7. The rotor shaft 7 is accommodated in a gear housing part 10.

In this embodiment, the support for the rotor shaft 7 consists of two angular ball bearings 11 and 12 that are located between the planetary aggregate 8 and the rotor 6. The angular ball bearings have cages at the inner and outer edges of the bearings. In this embodiment, a guide bearing 13 surrounds the two angular ball bearings 11 and 12, and that guide bearing 13 serves a radial collar 14 and a ring 15 for axial position fixing at surfaces 16 of the gear housing part 10. The guide bearing 13 is inserted in a location hole 18 of the gear housing 10 with radial play 17. The axial placement of the guide bearing by the radial collar 14 and the ring 15 provides an axial play 19 opposite the surfaces 16 of the gear housing part 10.

A flexible ring 20 is located between the guide bearing 13 and the location hole 18 that, first, acts within the radial play 17 as a damping device and, second, seals off the annular gap formed by the radial play 17 against the induction pressure cropping out in the compressor housing 3. The supercharger 1 is connected with the internal combustion engine's lubricant supply through a lubricating oil conduit 21, with a flow-regulating valve 22 located inside the lubricating oil conduit 21 to keep the quantity of lubricating oil delivered to the supercharger 1 constant no matter what the rotational speed of the internal combustion engine. The lubricating oil conduit 21 is connected with a lubricating oil bore located in the transmission case 10 that flows into a lubricant collecting chamber 24. To produce this collecting chamber 24, the guide bearing is made by a recess whose path on the periphery resembles a chord. From this lubricant collecting chamber 24, the lubricating oil goes through at least one inlet hole 25 into an area between the rotor 6 and the angular ball bearing 11 adjacent to it. This intake area for the lubricating oil is sealed off from the inside of the compressor housing 3 by a shaft gasket 26. This shaft gasket 26 has a sealing lip toward the rotor shaft that, seen in cross section, is shaped to bend toward the angular ball bearings 11 and 12, so that it lies on the rotor shaft 7 under the pressure of the lubricating oil and raises up from the rotor shaft 7 somewhat when an induction pressure appears in the compressor housing to allow a partial flow of manifold pressure to enter which conveys the lubricating oil flowing through the inlet holes 25 into the angular ball bearings 11 and 12. From the inside of the support of the rotor shaft 7, outlet holes 28 lead to another lubricating oil collecting chamber 29 from which the lubricating oil is carried off into the internal combustion engine's oil sump through a lubricant hole 30 and a conduit that is not shown.

It can be seen from the drawing that the lubricating oil penetrates from the lubricant collecting chamber 24 into the annular gap produced by radial play 17 at the guide bearing and provides for damping of the movement of the guide bearing 13 opposite the housing 10.

We claim:
1. In a mechanically driven supercharger including a fixed housing (10) containing a chamber (18) and a primary shaft (2) driven by an internal combustion engine, a rotor shaft (7) coaxial with and driven by the primary shaft via a planetary gear (8) and sun gear (9) assembly to rotate a rotor (6), the improvement which comprises
   (a) means for supporting said rotor shaft within the supercharger housing chamber, said supporting means having radial (17) and axial (19) play relative to said housing and comprising spaced angular ball bearings (11, 12); and
   (b) damping means for suspending said angular ball bearings in a floating manner within an annular gap defined by the radial play, said damping means including
      (1) a flow of lubricating oil for said angular ball bearings; and
      (2) a flexible ring (20) for sealing said annular gap.
2. A supercharger as defined in claim 1, wherein said radial and axial play is less than or equal to 0.1 mm and preferably on the order of 0.05 mm.
3. A supercharger as defined in claim 1, wherein said supporting means is arranged between the rotor and the planetary gear.
4. A supercharger as defined in claim 1, wherein said angular ball bearings are arranged in a cylindrical guide bearing (13) supported in a floating manner within said housing chamber.
5. A supercharger as defined in claim 4, wherein said guide bearing is supported at one end by a radial collar (14) arranged adjacent the rotor and at the other end by a ring (15), said ring and collar being axially spaced from surfaces (16) of the housing.
6. A supercharger as defined in claim 1, wherein said rotor is preassembled and counterbalanced as a unitary assembly with the rotor shaft, said angular ball bearings, said guide bearing, and the sun gear.
7. A supercharger as defined in claim 5, wherein said angular ball bearings include cages supported by one of said ring and said collar.
8. A supercharger as defined in claim 1, and further comprising a gasket (26) arranged between the rotor shaft and said guide bearing, whereby the lubricating oil for said angular ball bearings is confined to the area defined between said guide bearing and said gasket.
9. A supercharger as defined in claim 8, wherein said gasket includes a sealing lip (27) which raises under induction pressure from the rotor shaft, and further comprising a lubricating inlet (25) directly behind said gasket for delivering lubricating oil to said bearings in response to the increase in induction pressure.
10. A supercharger as defined in claim 9, wherein said guide bearing contains recesses (24, 29) in the outer surface thereof communicating with openings in said housing for the supply and return of lubricant.

* * * * *